United States Patent [19]

Sato

[11] 4,237,640
[45] Dec. 9, 1980

[54] REEL SEAT

[75] Inventor: Jun Sato, Sakai, Japan

[73] Assignee: Shimano Industrial Company, Limited, Osaka, Japan

[21] Appl. No.: 62,626

[22] Filed: Aug. 1, 1979

[51] Int. Cl.³ ............................................. A01K 87/06
[52] U.S. Cl. ...................................... 43/22; 24/263 B
[58] Field of Search .......................... 43/22; 24/263 B; 269/214, 212, 188, 196, 201; 180/614, 633; 9/310 AA

[56] References Cited

U.S. PATENT DOCUMENTS

| 394,793 | 12/1880 | Stoecklin | 269/196 |
| 1,228,214 | 5/1917 | Johnson | 269/214 X |
| 2,027,243 | 1/1936 | Miller | 43/22 |
| 3,461,594 | 8/1969 | Ohmura | 43/22 |

Primary Examiner—Nicholas P. Godici
Attorney, Agent, or Firm—Stevens, Davis, Miller & Mosher

[57] ABSTRACT

A reel seat having a stationary socket and a movable socket is provided with a retainer separate therefrom. The retainer has a retaining leaf spring and control segment and serves to fix the movable socket in position at a seat body. An interconnecting member is inserted between the movable socket and the control segment at the retainer. The control segment is operated to hold the retainer and pushes the movable socket toward the stationary socket through the interconnecting member by use of swinging motion of the control segment, thereby holding the reel leg steadily between both sockets.

6 Claims, 12 Drawing Figures

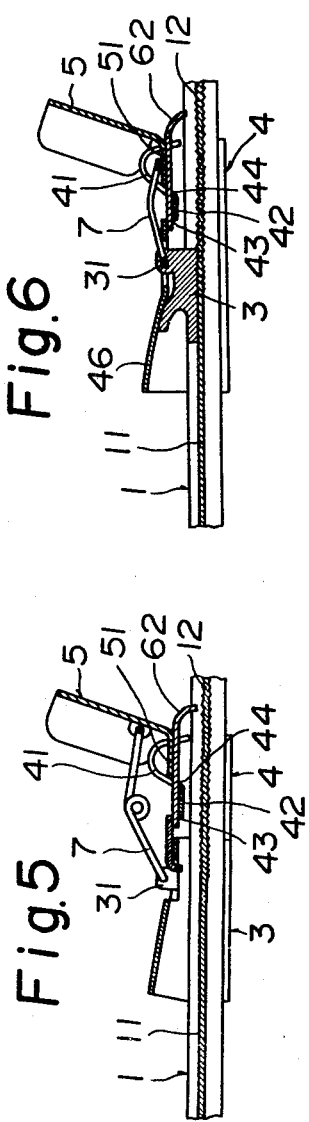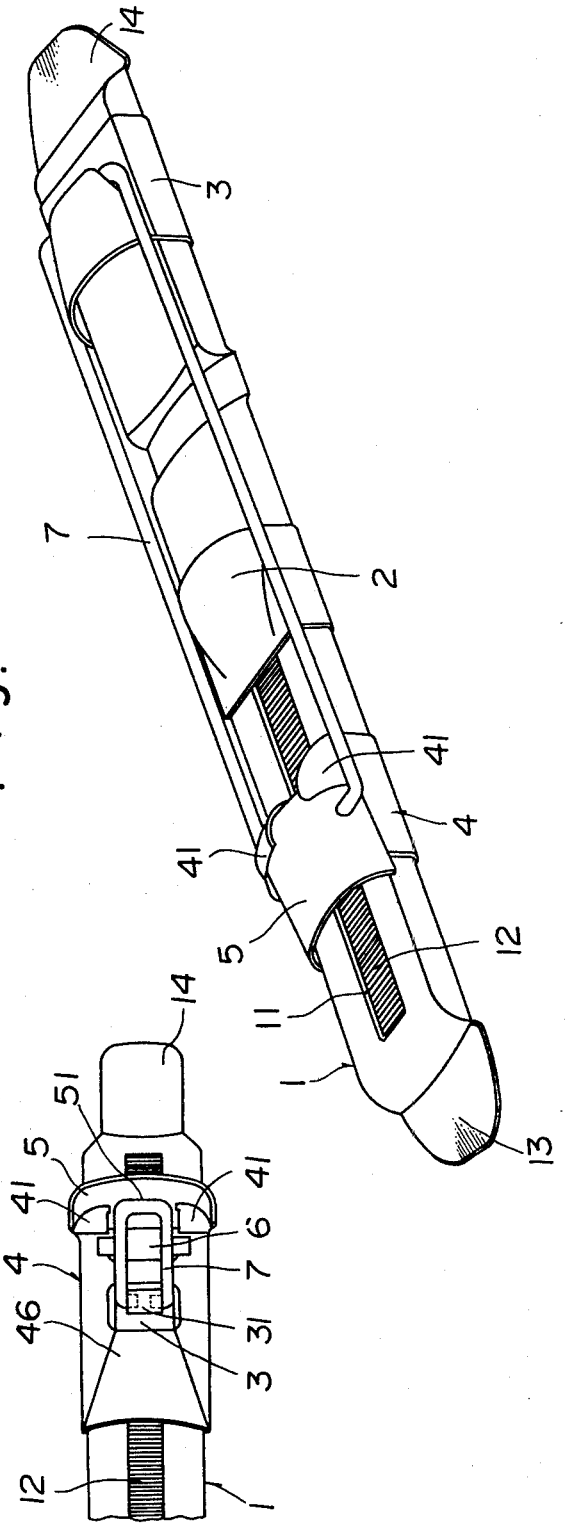

REEL SEAT

This invention relates to a reel seat through which a fishing reel is mounted at its leg along a fishing rod, and more particularly to a reel seat having a seat body, including a grooved portion, mounted to a fishing rod lengthwise thereof, a stationary socket provided at one lengthwise end of the seat body, and a movable socket provided slidably at the seat body, so that the leg of fishing reel may be fixed between the stationary socket and the movable socket.

Generally, this kind of reel seat holds the reel leg in such a manner that the reel leg is inserted at its one end into the stationary socket and sleeved at the other end by the slidably movable socket and the control segment is operated to bias toward the seat body grooves a retaining leaf spring supported to the movable socket so that the leaf spring is fitted at its bent end into a groove at the seat body, thereby retaining the movable socket to the seat body, thus holding the reel leg between both sockets.

When fixing the reel leg by operating the control segment as just described, the movable socket happens to move apart from the stationary socket. If this does not occur, the leaf spring is engaged with an improper one of the grooves so that the movable socket tends to leave the stationary socket. As a result, the reel leg, even though fixed between both sockets, is still unsteady making it difficult to handle the fishing reel while fishing.

This invention has been designed to overcome this problem. An object of the invention is to provide a reel seat capable of ensuring the steady fixing of the reel leg between both the stationary and movable sockets.

The reel seat of the invention is provided with a retainer separate from the movable socket at the conventional reel seat. Although the conventional movable socket has the retaining leaf spring and control segment and serves to receive the reel leg, the retainer is provided with the leaf spring and control segment so as to fix the movable socket in position at the seat body. An interconnecting member is inserted between the movable socket and the control segment at the retainer, so that swinging motion of the control segment when operated, may be converted into rectilinear motion through the interconnecting member to be transmitted to the movable socket. Hence, when the control segment is operated to retain the leaf spring to one of the grooves at the seat body, the movable socket is forcibly pushed toward the stationary socket through the interconnecting member.

In other words, the invention is directed to provide the retainer at the reel seat having the stationary socket and movable socket, the retainer being separate therefrom and having the retaining leaf spring and control segment for the purpose of fixing the movable socket in position at the reel seat. An interconnecting member is inserted between the movable socket and the control segment at the retainer, whereby when the control segment is operated to hold the retainer, the swinging motion of control segment is used to forcibly push the movable socket toward the stationary socket to thereby fix the reel leg steadily between both sockets.

These and other objects and features of the invention will become more apparent from the following description of embodiments thereof in accordance with the accompanying drawings, in which.

Figure 3:
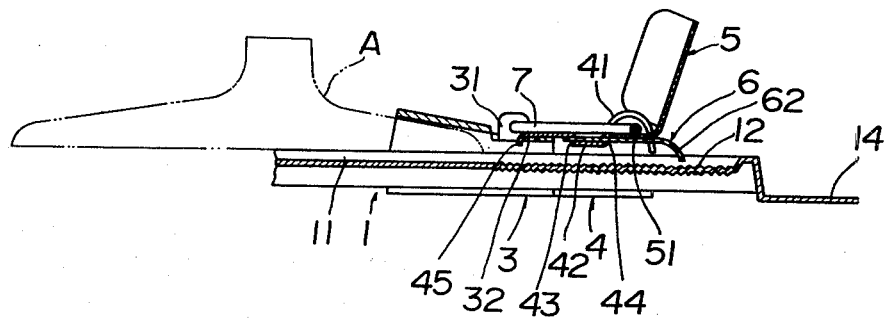
FIG. 3 is a sectional view of the principal portion in FIG. 2.
Figure 4:
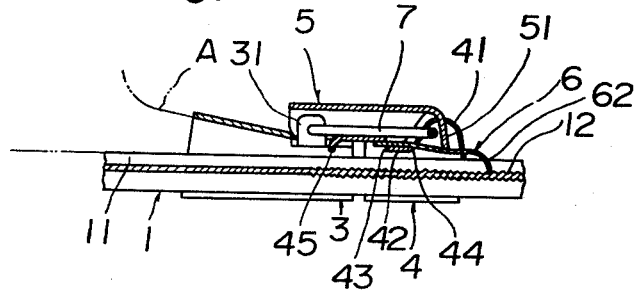
Figure 9:
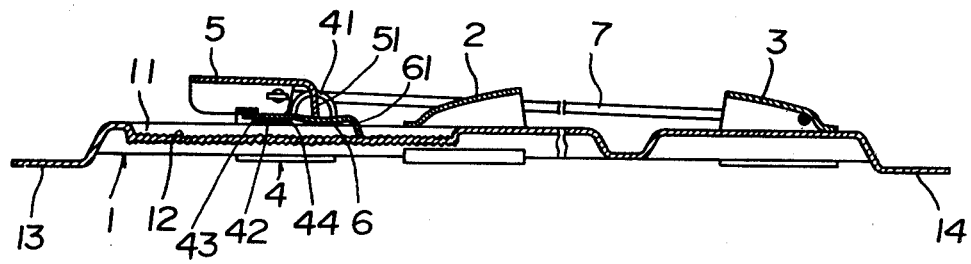
Figure 10:
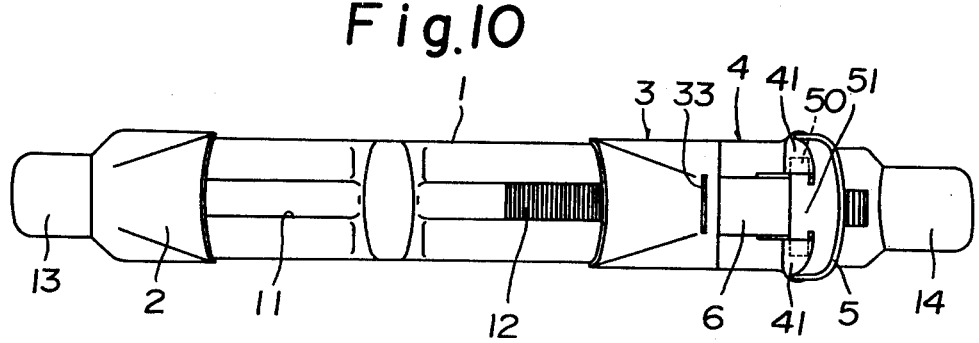
Figure 11:
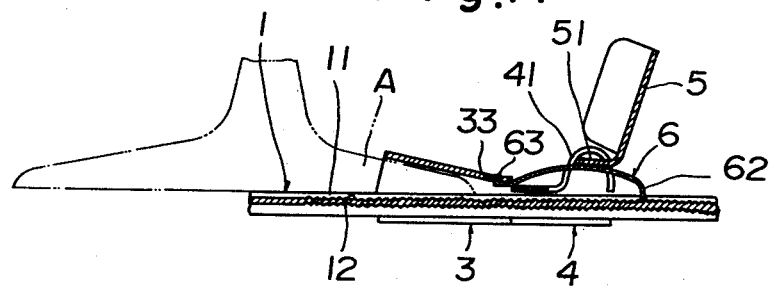
Figure 12:
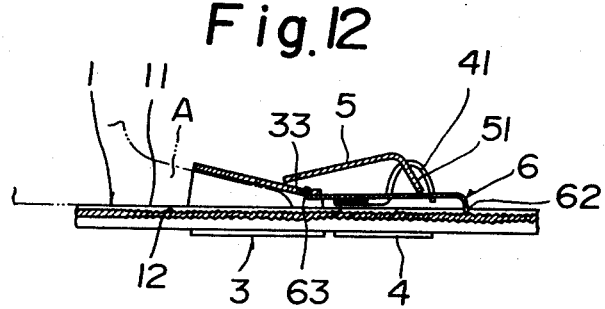

FIG. 4 is a sectional view of the principal portion, in which the control segment is operated from the condition in FIG. 3, FIGS. 5 and 6 are sectional views of modified embodiments, which correspond to FIG. 3, FIG. 7 is a plan view of the modified embodiment in FIG. 6, FIG. 8 is a perspective view of another modified embodiment, FIG. 9 is a partially omitted sectional view of the embodiment shown in FIG. 8, FIG. 10 is a plan view of a further modified embodiment, FIG. 11 is a sectional view of the principal portion of the embodiment shown in FIG. 10, and FIG. 12 is a sectional view of the principal portion, showing the control segment operated from the condition shown in FIG. 11.

Referring to the drawings, reference numeral 1 designates a seat body mounted to a fishing rod. At the intermediate portion of width of seat body 1 is formed a recess 11 extending lengthwise of the body. At one lengthwise side of recess 11 are provided a number of grooves 12 which are extending widthwise of the recess 11 and arranged in continuation lengthwise thereof. The seat body 1 is formed of a pressed metallic plate of an inverted U-like shape in section. At both lengthwise ends of seat body 1 are provided tongues 13 and 14 through which the reel seat is mounted to the fishing rod. The tongues 13 and 14 abut against the outer peripery of the fishing rod and are fixed thereto by fixing means, such as stiff strings and adhesives. When the reel seat is fixed onto the rod, both lengthwise side edges of the inverted U-like shaped body 1 are apart from the rod. Since the constitution of the reel seat is well-known, widely used, and readily understood by those skilled in the art, a detailed description thereof is not necessary.

Reference numeral 2 designates a stationary socket fixed at one lengthwise end of the seat body 1. The stationary socket 2 holds one lengthwise end of reel leg A extending lengthwise of the fishing rod, and is formed of a pressed metallic plate which is fixed at side edges of the body 1.

Reference numeral 3 designates a movable socket, which is supported at the other lengthwise end of seat body 1 in relation of being slidable lengthwise thereof and is opposite to the stationary socket 2. The movable socket 3 is formed of a pressed metallic plate bent at both widthwise ends to abut against both side edges of the inverted U-like shaped seat body 1 and further engages at the inturned edges with the side edges of seat body 1 to thereby be slidable thereon.

Reference numeral 4 designates a retainer separate from the movable socket 3. The retainer 4, which serves to retain the movable socket 3 in position at the seat body 1, is formed of a pressed metallic plate, and overlies the seat body 1 in relation of being slidable thereon.

Figure 1:
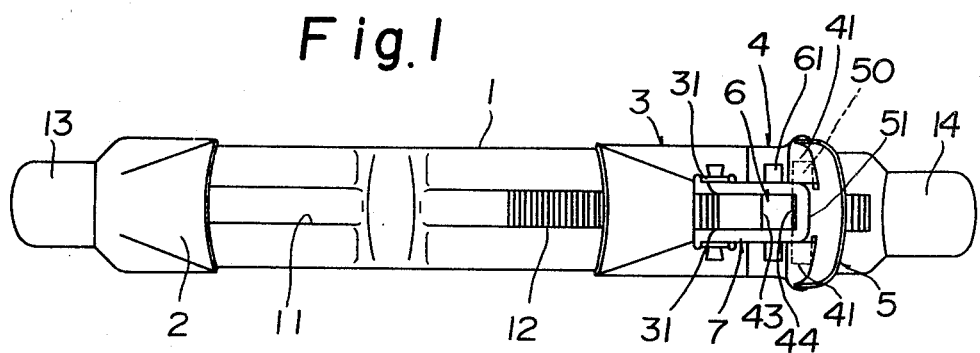
FIG. 1 is a plan view of an embodiment of the invention.
Figure 2:
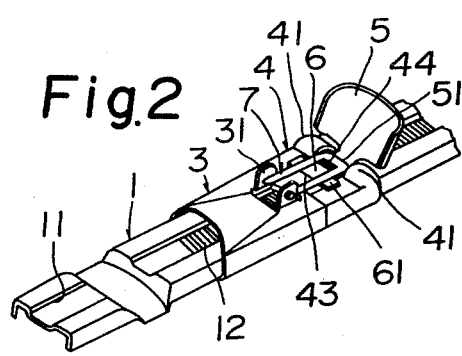
FIG. 2 is a perspective view of the principal portion thereof.

As best seen from FIG. 2, the retainer 4 has at both widthwise sides a pair of swollen portions 41. The swollen portions 41 are opened at the opposite faces thereof so that a control segment 5 is swingably supported to the openings. At a lengthwise intermediate portion of retainer 4 is provided a recess 42. The recess 42 is provided at both ends thereof lengthwise of the seat body 1 with slits 43 and 44 through which a leaf spring 6 is insertably supported.

The leaf spring 6 has at its substantially lengthwise intermediate portion a pair of wings 61 extending widthwise outwardly of the same, the wings 61 being fitted onto the recess 42. The leaf spring 6 also is inserted at its portions before and behind the wings 61 into the slots 43 and 44 and bent at the tail 62 toward the seat body 1, the bent tail 62 being engaged with one of the grooves 12. The control segment 5, which operates the leaf spring 6 to engage with one of the grooves 12, is pivotally supported into the swollen portions 41 through a pair of ears 50 respectively, and the longtidinally utmost end of the aforesaid pivoting portion is bent in L-like shape to thereby form a contact end 51. The control segment 5 is turned in the direction of closing (counterclockwise in the drawings) to enforce the contact end 51 to contact with the leaf spring 6 and press it, whereby the leaf spring 6 is elastically deformed to elastically engage at the bent end 62 with one of the grooves 12, thus fixing the retainer 4.

Reference numeral 7 designates an interconnecting member inserted between the movable socket 3 and the control segment 5 pivoted to the retainer 4. The interconnecting member 7 converts the swinging motion of control segment 5 in the closing direction thereof into rectilinear motion to thereby push the movable socket 3 to forcibly move it toward the stationary socket 2. In detail interconnecting member 7 shown in FIGS. 1 to 4 is formed of a wire rod bent in U-like shape. Tips of legs of the member 7 are connected non-rotatably to a pair of supports 31 projecting from the movable socket 3 and the apex of the U-like shape is contacted with the contact end 51 at the control segment 5. Hence, the displacement of contact end 51 toward the stationary socket 2 when the control segment 5 swings in its closing direction, is utilized to allow the interconnecting member 7 to travel in rectilinear motion toward the stationary socket 2, so that the movable socket 3 is urged thereto due to the fixed point of the engagement of bent end of leaf spring 6 with one of the grooves 12.

In addition, as seen from FIGS. 3 and 4, the retainer 4 is provided at one end at the left side in the drawings with an extension 45 extending toward the movable socket 3. The extension 45 is connected at its end with the movable socket 3 through a slot 32 thereat so that the movable socket 3 may follow the retainer's lengthwise movement. This construction facilitates removal of the reel leg A from the reel seat.

Next, application and operation of the reel seat constructed as described above follows.

Firstly, when the fishing reel is mounted to the reel seat, the reel leg A is inserted at its one end into the stationary socket 2; the movable socket 3 together with the retainer 4 is slidably moved toward the stationary socket 2 along the seat body 1 to fit onto the other end of reel leg A; the control segment 5 is turned counterclockwise (in the drawings), thereby allowing the contact end 51 of control segment 5 to contact with the leaf spring 6 and push it toward the seat body 1; the leaf spring 6 is engaged at its bent end 61 with one of the grooves 12 at the seat body 1; and the retainer 4 is retained thereto. In this instance, the interconnecting member 7 abuts against the contact end 51 and is pushed toward the stationary socket 2 following the swinging motion of control segment 5 in its closing direction, whereby the movable socket 3 grips the other end of reel leg A, thus ensuring steady fixing of the reel leg A between both the sockets 2 and 3.

In addition, the invention is not limited to the aforesaid construction, but may be improved or augmented with design changes as follows:

(1) The interconnecting member 7, which is inserted between the movable socket 3 and the control segment 5 at the retainer 4, is pivoted at one end to the control segment 5 and contacts at the other end with the movable socket 3.

(2) The interconnecting member 7 is pivoted at both ends thereof to the movable socket 3 and control segment 5 respectively.

(3) A torsion spring is used for the interconnecting member 7 as shown in FIG. 5, which and is pivoted to the movable socket 3 and control segment 5 respectively.

(4) The movable socket 3 is formed in a block of synthetic resin and a hood 46 (FIGS. 6 and 7) is provided at the retainer 4 in order to cover the movable socket 3 so that the movable socket 3 may slide lengthwise of the seat body 1 within the hood 46.

(5) The retainer 4 is positioned outside the movable socket 3 and stationary socket 2, with the latter between the retainer 4 and movable socket 3 as shown in FIGS. 8 and 9 and the interconnecting member 7 between the retainer 4 and the movable socket 3 is made larger in length so as to be pivoted to the movable socket 3 and control segment 5 at the retainer 4 respectively.

(6) The leaf spring 6 supported to the retainer 4 as shown in FIGS. 10 through 12, is bent upwardly as shown in FIG. 11. The leaf spring 6 is connected at its one end with the movable socket 3 so as to be used as a interconnecting member for connecting the movable socket 3 and retainer 4. In this improved example, no interconnecting member is required, thereby simplifying the construction of reel seat. In addition, the leaf spring 6 is connected with the movable socket 3 in such a manner that a slit 33, which is provided at the movable socket 3 and extends widthwise thereof, is engaged with an upwardly bent end 63 of leaf spring 6. In this connection, the bent end 63 may only contact with the rear end of movable socket 3, or the end of leaf spring 6 may be fixed by soldering.

In the construction shown in FIGS. 10 through 12, when the control segment 5 is operated in its closing direction (counterclockwise in the drawings) from the condition in FIG. 11 to that in FIG. 12, the leaf spring 6 is deformed flat as shown in FIG. 12 and its bent tail 62 is retained to one of the grooves 12. As a result, the leaf spring 6 becomes larger in length than that in free condition as shown in FIG. 11, whereby the movable socket 3 is pushed toward the stationary socket 2 to reliably grip the reel leg A as the same as the former embodiments.

(7) The seat body 1 is formed of a pipe instead of its formation of inverted U-like shape in section.

As clearly understood from the above description, the reel seat of the invention is provided with a retainer separate from the movable socket, the retainer retaining the movable socket in the predetermined position lengthwise of the seat body, and having a swinging control segment and leaf spring. The swinging motion of the control segment is converted into rectilinear motion which is transmitted to the movable socket through the interconnecting member, so that the movable socket is pushed toward the stationary socket by the retainer secured to the seat body through the leaf spring retained thereto. Hence, the fishing reel leg can be reliably and steadily fixed between the stationary and movable sockets.

As many apparently widely different embodiments of this invention may be made without departing from the spirit and scope thereof, it is to be understood that the invention is not limited to the specific embodiment described but only by the attached claims.

What is claimed is:

1. A reel seat for mounting the leg of a fishing reel to a fishing rod comprising:
    (a) a seat body mounted to said fishing rod lengthwise thereof, said seat body having at its upper surface at one lengthwise end a number of grooves which extend widthwise of said seat body and are arranged lengthwise thereof,
    (b) a stationary socket fixed to one lengthwise end of said seat body for receiving one end of said reel leg,
    (c) a movable socket positioned at the other lengthwise end of said seat body opposite to said stationary socket for receiving the other end of said reel leg, said movable socket being supported to said seat body so as to be slidable lengthwise thereof,
    (d) a retainer for fixing said movable socket in the predetermined position lengthwise of said seat body, said retainer being supported slidably to said seat body and having a leaf spring having a bent portion engageable with one of said grooves at said seat body and a control segment swingable to control the engaging movement of the bent portion of said leaf spring with said grooves, and
    (e) an interconnecting member inserted between said movable socket and said control segment at said retainer, said interconnecting member being connected at at least one end thereof with one of said movable socket and control segment of said retainer, so that when said control segment swings to allow said leaf spring to engage with said grooves, said interconnecting member is moved rectilinearly by swinging motion of said control segment to move said movable socket toward said stationary socket.

2. A reel seat according to claim 1, wherein said movable socket is positioned between said retainer and said stationary socket and said retainer is adjacent to said movable socket.

3. A reel seat according to claim 2, wherein said interconnecting member for connecting said retainer and movable socket comprises a wire rod which is connected at at least one end with one of said movable socket and control segment at said retainer and contacts at the other end with the other of said movable socket and control segment at said retainer.

4. A reel seat according to claim 2, wherein said interconnecting member comprises a torsion spring which is pivoted at one end thereof to said movable socket and at the other end to said control segment at said retainer.

5. A reel seat according to claim 2, wherein said leaf spring provided at said retainer is curved upwardly and connected at its one end with said movable socket, said leaf spring being used as said interconnecting member connecting said retainer and movable socket.

6. A reel seat according to claim 1, wherein said stationary socket is positioned between said retainer and said movable socket, said retainer is adjacent to said stationary socket, and said interconnecting member inserted between said retainer and said movable socket is pivoted at opposite ends thereof to said movable socket and control segment at said retainer respectively.

* * * * *